United States Patent
Qiu et al.

[11] Patent Number: 5,977,556
[45] Date of Patent: Nov. 2, 1999

[54] RADIATION IMAGING DEVICE WITH PHOTOSTIMULABLE PHOSPHOR

[75] Inventors: Jianorong Qiu; Kazuyuki Hirao, both of Kyoto, Japan

[73] Assignees: Japan Science and Technology Corporation; Jianrong Qiu, both of Japan

[21] Appl. No.: 09/156,013

[22] Filed: Sep. 17, 1998

Related U.S. Application Data

[63] Continuation of application No. 08/764,846, Dec. 13, 1996, abandoned.

[30] Foreign Application Priority Data

Dec. 14, 1995 [JP] Japan .................................. 7-347277
Nov. 8, 1996 [JP] Japan .................................. 8-296379

[51] Int. Cl.$^6$ ............................ G01N 23/04; G21K 4/00; C09K 11/08
[52] U.S. Cl. .................. 250/585; 250/581; 250/484.4; 252/301.4 P; 252/301.4 H; 252/301.4 F; 252/301.6 P; 252/301.6 F
[58] Field of Search .................................. 250/581, 582, 250/585, 484.2, 484.4; 252/301.4 P, 301.4 F, 301.4 H, 301.6 P, 301.6 F

[56] References Cited

U.S. PATENT DOCUMENTS

| | | | |
|---|---|---|---|
| 3,522,199 | 7/1970 | Turner et al. | 252/301.4 P |
| 4,102,805 | 7/1978 | Mizzoni et al. | 501/64 |
| 4,798,681 | 1/1989 | Oversluizen et al. | 501/64 |
| 4,798,768 | 1/1989 | Oversluizen et al. | 501/64 |
| 4,814,105 | 3/1989 | Oversluizen et al. | 501/54 |
| 5,358,668 | 10/1994 | Leblans | 252/584 |
| 5,444,266 | 8/1995 | Takeda et al. | 250/586 |
| 5,567,351 | 10/1996 | Qi et al. | 252/301.4 R |
| 5,639,399 | 6/1997 | Iwase et al. | 252/301.4 H |
| 5,670,086 | 9/1997 | Papadopoulos et al. | 252/301.4 P |
| 5,693,254 | 12/1997 | Sieber et al. | 252/301.4 H |
| 5,755,998 | 5/1998 | Yamazaki et al. | 252/301.4 P |
| 5,811,822 | 9/1998 | Huston et al. | 250/484.4 |
| 5,886,354 | 3/1999 | Leblans | 250/484.4 |

OTHER PUBLICATIONS

Verwey, J.W.M. et al., "The Luminescence of Divalent and Trivalent Rare Earth Ions In Syam–Fluoride Glass", *J. Phys. Chem. Solids*, 53(4), pp. 1157–1162 (1992).

Chemical Abstract cit. 114:132977: Bueno et al., "Luminescent Glass Design for High Energy Real–Time Radiography", *Proc. SPIE–Int. Sco. Opt. Eng.* pp. 79–91 (1990).

Brundage, R.T. et al., "Homogeneous Linewidth of the $^5D_0$–$^7F_0$ transition of trivalent europium in a fluorophosphate glass", *Physical Review B*, 53, pp. R8821–R8823 (1996).

(List continued on next page.)

*Primary Examiner*—Constantine Hannaher
*Assistant Examiner*—Albert Gagliardi
*Attorney, Agent, or Firm*—Webb Ziesenheim Logsdon Orkin & Hanson, P.C.

[57] ABSTRACT

A radiation imaging device including a photostimulable phosphor which is a glass including active cations that release light having a wavelength in the blue colour or ultra-violet region when those parts of the glass which have been stimulated by radiation, and a radiation source to irradiate the phosphor and an excitation light source to photostimulate the phosphor. The radiation source may be X-rays, γ-rays, α-rays, β-rays, electron beams, neutron beams, ion beams, ultra-violet rays having an energy equal to or greater than the band gap of the glass are excited by visible or infra-red light. $Ce^{3+}$, $Eu^{2+}$ can be used as the active cation, and are preferably included in an amount of 10 mole % or less of all the cations, and particularly preferably in an amount in the range of 0.001 to 2 mole %. A silicate glass, a borate glass, a phosphate glass, a mixed oxide glass consisting of at least two of a silicate, a borate and a phosphate, a halide glass, a halogen phosphate glass are used as the basic glass. The device has practical durability and mechanical strength and is suited to the recording and playback of radiation images.

18 Claims, 2 Drawing Sheets

PHOTOSTIMULATED LUMINESCENCE EMISSION SPECTRUM MEASURING SYSTEM

OTHER PUBLICATIONS

Qiu, Jianrog et al., "Photostimulated luminescence of $Ce^{3+}$–doped alkali borate glasses", *Appl. Phys. Lett.* 71 (1), pp. 43–45 (Jul. 1997).

Qiu, Jianrong et al., "Photostimulated luminescence in $Eu^{2+}$–doped fluoroaluminate glasses", *Appl. Phys Lett.* 71(6), pp. 759–761 (Aug. 1997)

Qiu, Jianrong et al., "Photostimulated luminescence inborate glasses doped with $Eu^{2+}$ and $Sm^{3+}$ ions", *Elsevier Science B.V., Journal of Non–Crystalline Solids 00*, pp. 1–6 (1997).

PHOTOSTIMULATED LUMINESCENCE EMISSION SPECTRUM MEASURING SYSTEM

PHOTOSTIMULATED LUMINESCENCE EXCITATION SPECTRUM MEASURING SYSTEM

PHOTOSTIMULATED LUMINESCENCE EXCITATION SPECTRUM

AFTER-GLOW CHARACTERISTIC

RADIATION IMAGING DEVICE WITH PHOTOSTIMULABLE PHOSPHOR

CROSS-REFERENCE TO RELATED APPLICATIONS

This application is a continuation of U.S. Ser. No. 08/764,846, now abandoned filed Dec. 13, 1996, entitled "Photostimulable Phosphor".

FIELD OF THE INVENTION

The present invention relates to a photostimulable phosper which is a glass composition used in radiation dosimeters, radiation image conversion panels etc. which work on photostimulated luminescence, and also relates to recording and playback of radiation images using photostimulable luminescence glass.

In X-ray intensifying screen and image intensifiers, phosphors which generate luminescence in response to the dose of X-rays absorbed by it are used. In order to reduce the dose of radiation to which, for example, a patient or user of a X-ray related device is exposed to, there have been demands for the development of a phosphor which generates good luminescence even upon minute doses of X-ray exposure, i.e. which is highly sensitive to X-rays.

The radiation image conversion method is known as a method which can be used instead of radiography which uses silver salts. In this method, a phosphor is made to absorb radiation which has passed through an object, and then this phosphor is excited with a certain type of energy to cause the radiation energy stored in the phosphor to be released as luminescence. For example, a panel having a layer of a photostimulable phosphor formed on a support such as paper is used, and visible light radiation and infrared radiation is used as the excitation energy.

The radiation image conversion method which is disclosed in Japanese Patent Application Publication No. Sho 59-75200 and employs $BaFX;Eu^{2+}$ (X:Cl,Br,I) as the photostimulable phosphor, has the following excellent features and has started to be used in a wide range of fields such as medical science, medical treatment, medicine, bioscience, high energy, mining etc.

(1) Has a sensitivity from tens to hundreds of times as high as that of photographic film; stored noise can be eliminated before use; low noise.
(2) With respect to photostimulated luminescence, it linearly responds to doses of radiation in a wide range of five figures, has a wide dynamic range and has excellent linearity.
(3) Has wide sensitive area; high resolution.
(4) Can easily be connected to a computer whereby a direct digital image signal can be obtained during the reading process, thereby facilitating storage and retrieval.
(5) Can be used repeatedly.

However, in the case of phosphors such as $BaFX;Eu^{2+}$, the process of production thereof is extremely complicated, the number of production process steps is large, and the time required for production is long, making them extremely costly. Furthermore, due to the fact that they are generally synthesized in the solid phase at temperatures around 1000° C., there is a tendency for the particles to agglomerate. As a result, in order to increase the fluorescent strength, crushing and classification has to be carried out during the stage of after-treatment to obtain, to a great extent as possible, particles all having a same suitable size, and this results in a reduced yield. Furthermore, methods of depositing or applying coatings of the phosphor in its powder form onto a substrate are used in order to form a fluorescent sheet, and due to the fact that powders have multi-faced shapes, the surface of the sheet becomes pitted with the result that fine control processes were deemed necessary in order to provide a uniform film, and even then the formation of a uniform film was almost impossible. Furthermore, due to the fact that the powder particles are relatively roughly packed together, and that the surface has a pitted shape, the fluorescence generated by excitation is repeatedly scattered between the phosphor particles with the result that the amount of light passing through the front face of the fluorescent sheet was reduced. Consequently, the sensitivity was reduced, the uniformity of sensitivity was poor, and it was impossible to increase the resolution beyond a certain critical value.

On the other hand, there have also been developed glass dosimeters which detect radiation such as X-rays. The main types are type I(for example, $SiO_2$—$B_2O_3$—$Na_2O$—$Al_2O_3$ system glass containing $Co^{2+}$; $Mn^{2+}$-$Fe^{3+}$-containing glass; $Mg(PO_3)_2$ glass; $Sb_2O_3$ system glass; $Bi_2O_3$ containing glass; phosphate glass containing Ag etc.), which use the phenomenon in which the glass becomes coloured by exposure to radiation; type II ($Li_2O$—$Al_2O_3$-$SiO_2$ glass containing $Tb^{3+}$; phosphate glass containing Mn etc.) which work on the fact that trap centres generated by exposure to radiation emit fluorescence when heated and then disappear; and type III (phosphate glass containing Ag etc.) which work on radiophotoluminescence.

With type I, the range of doses which can be measured is narrow, and playback by heating is not complete. Furthermore, $Sb_2O_3$ system glasses and $Bi_2O_3$-containing glasses are difficult to produce stably.

With type II which work on thermo-luminescence, the sensitivity is low and there is the problem of deformation upon heating. Furthermore, it is impossible to substantially measure the dose distribution of radiation such as X-rays etc.

Type III work on the phenomenon of radiophotoluminescence in which orange-coloured fluorescence is emitted when Ag-containing phosphate glass is exposed to radiation such as X-rays and then stimulated with ultra-violet light having a wavelength of about 360 nm. By measuring the amount of fluorescence generated by this phenomenon, it is possible to determine how much radiation the glass was exposed to. The electrons generated by the exposure to radiation are trapped by $Ag^+$ whereby $Ag^+$ is converted into $Ag^0$, and the positive holes are trapped by the $PO_4$ tetrahedrons which make up the network of the phosphate glass. With time, the positive holes transfer to $Ag^+$ whereby $Ag^{2+}$ centres are generated. This is known as build-up of radiophotoluminescence. The speed thereof will depend on the composition of the glass, but even in the case of the fastest glasses, it takes about ten to twenty minutes, and with some glasses it takes a number of days. As a result, it is impossible to measure radiation doses or synthesize images in a short period of time. In addition, the dynamics range is narrow and the operability is poor.

SUMMARY OF THE INVENTION

The present invention was realised in order to solve these kinds of problems. Through the exploitation of the characteristics of glass such as uniformity and its capability to be polished to high precision, and through the existence of $Ce^{3+}$, $Eu^{2+}$ etc. as active cations for photostimulated luminescence in the glass composition, the present invention has as its objective highly reliable recording and playback of radiation images using a photostimulable luminescence glass which has practical durability and mechanical strength, does not exhibit the direction dependency with respect to light emission observed with crystals, and has good formability and uniformity of sensitivity.

In order to realise this objective, the photostimulable phosphor of the present invention is a glass which includes active cations which emit light of a wavelength in the ultraviolet or blue-colour region when parts thereof which have been exposed to radiation such as X-rays, γ-rays, α-rays, β-rays, electron beams, neutron beams, ion beams and ultraviolet rays having an energy equal to or greater than the bandgap of glass, are excited by visible light or infra-red light. When $Ce^{3+}$, $Eu^{2+}$ etc. are used as the active cations, they are included in a total amount of 10 mole % or less on the basis of all of the cations, and preferably in an amount in the range of 0.001 to 2 mole %. As the glass, a silicate glass, a borate glass, a phosphate glass, a mixed oxide glass consisting of at least two of a silicate, a borate and a phosphate, a halide glass or a halogen phosphate glass may be used.

In the case of an oxide glass, it is preferable that the photostimulable phosphor of the present invention includes, as cations which comprise the glass, 30 to 99 mole % (preferably 45 to 95 mole %) of at least one of $Si^{4+}$, $B^{3+}$ and $P^{5+}$, 0 to 70 mole % (preferably 5 to 60 mole %) of at least one of $Li^+$, $Na^+$, $K^+$, $Rb^+$, $Cs^+$ and $Tl^+$, 0 to 70 mole % (preferably 0 to 40 mole %) of at least one of $Mg^{2+}$, $Ca^{2+}$, $Sr^{2+}$, $Ba^{2+}$, $Cd^{2+}$, $Pb^{2+}$ and $Zn^{2+}$, 0 to 30 mole % (preferably 0 to 10 mole %) of $Al^{3+}$, and 0 to 40 mole % (preferably 0 to 30 mole %) of at least one of $Y^{3+}$, $Sc^{3+}$, $Ga^{3+}$, $In^{3+}$, $Bi^{3+}$ and $Ln^{3+}$ (where Ln is a rare earth element other than Ce), wherein the percentages are based on the total of all cations.

In the case of a halide glass, it is preferable that the photostimulable phosphor has a composition including, as the cations which comprise the glass, 10 to 60 mole % (preferably 20 to 40 mole %) of $Al^{3+}$, 8 to 70 mole % (preferably 8 to 60 mole %) of at least one of $Mg^{2+}$, $Ca^{2+}$, $Sr^{2+}$ and $Ba^{2+}$, 0 to 30 mole % (preferably 0 to 25 mole %) of at least one of $Y^{3+}$ and $Ln^{3+}$ (wherein Ln is a rare earth element other than Ce), 0 to 20 mole % (preferably 0 to 15 mole %) of $Hf^{4+}$ and 0 to 20 mole % (preferably 0 to 10 mole %) of at least one of $Li^+$, $Na^+$ and $K^+$, wherein the percentages are based on the total of all cations, and including, as anions which comprise the glass, 0 to 20 mole % (preferably 0 to 10 mole %) of $Cl^-$, and 80 to 100 mole % (preferably 90 to 100 mole %) of $F^-$, wherein the percentages are based on the total of all anions.

In the case of a halogen phosphate glass, it is preferable that the photostimulable phosphor has a composition including, as the cations which comprise the glass, 10 to 60 mole % (preferably 20 to 40 mole %) of $Al^{3+}$, 0.1 to 80 mole % (preferably 5 to 60 mole %) of $P^{5+}$, 8 to 70 mole % (preferably 8 to 60 mole %) of at least one of $Mg^{2+}$, $Ca^{2+}$, $Sr^{2+}$ and $Ba^{2+}$, 0 to 30 mole % (preferably 0 to 25 mole %) of at least one of $Y^{3+}$ and $Ln^{3+}$ (wherein Ln is a rare earth element other than Ce), 0 to 20 mole % (preferably 0 to 15 mole %) of $Hf^{4+}$ and 0 to 20 mole % (preferably 0 to 10 mole %) of at least one of $Li^+$, $Na^+$ and $K^+$, wherein the percentages are based on the total of all cations, and including, as anions which comprise the glass, 1 to 95 mole % (preferably 1 to 50 mole %) of $O^{2-}$, 0 to 20 mole % (preferably 0 to 10 mole %) of $Cl^-$ and 5 to 99 mole % (preferably 40 to 99 mole %) of $F^-$, wherein the percentages are based on the total of all anions.

The batch composed to a photostimulable phosphor consisting of a glass having the desired composition, is then melted and shaped either in a reducing atmosphere or after addition of a reducing agent. The molten glass composition may then be formed into a flat sheet, a curved face or fibers. Glass fibers may be further bundled together to form a microchannel plate having a flat structure.

The photostimulable phosphor is made to absorb radiation or radiation which has been passed through an object, whereafter it is irradiated by visible light or infra-red light to cause it to release the energy held by it in the form of ultra-violet or blue-colour fluorescence. Recording and playback is carried out by detecting the fluorescence with fluorescence detecting means.

If a photostimulable phospor including $Ce^{3+}$ is exposed to radiation such as X-rays having an energy greater than the bandgap of glass, pairs of electrons and positive holes are generated in the glass. The electrons are trapped by defects existing in the glass, to form, for example, F-centres. The positive holes are trapped by the $Ce^{3+}$. The energy level of both of these trap centres lies between the valence band and conduction band of glass, and since the depth thereof is relatively deep, they exist stably at room temperatures. This state corresponds to the state in which the image is stored, i.e. the state in which the image is recorded.

The glass is then irradiated by a He—Ne laser (wavelength 633 nm), a YAG laser (wavelength 1.06 μm) or visible light having an energy corresponding to the difference in energy between the ground state and the excited state of the electron trap centres, whereby the electrons of the F-centres are stimulated and released, and recombine with the positive holes trapped by the positive hole trap centres $Ce^{3+}$. The energy of this recombination causes light emitting centres situated right close by to become excited to an excited state, and when these return to the ground state they give out an ultraviolet or blue-colour light. The intensity of the light emitted is proportional to the dose of radiation to which the glass was exposed at the beginning, and thus the dose of radiation can be measured by measuring the intensity of the light emitted.

$Eu^{2+}$-containing glass also emits fluorescence through stimulation by a similar mechanism to that discussed above for $Ce^{3+}$.

As described above, the photostimulable phosphor of the present invention which is a glass includes, as an active cation, at least one of $Ce^{3+}$ and $Eu^{2+}$. Excitation with radiation such as X-rays, γ-rays, α-rays, β-rays, electron beams, ultraviolet rays having an energy greater than the band gap of the glass, neutron beams, ion beams causes the formation of trap centres which have an energy level between the valence electron band and conduction band of the glass, and which exist stably at room temperature. As a result, it is possible to produce radiation dosimeters and radiation image conversion panels with which the measurement of exposure doses and the synthesis of images can be carried out in a short time. Furthermore, since it has excellent glass formability and thus can be easily formed into various forms such as sheets, rods and fibers etc., it may be used as a photostimulable phosphor having practical durability and mechanical strength.

DETAILED DESCRIPTION OF THE INVENTION

Figure 1:
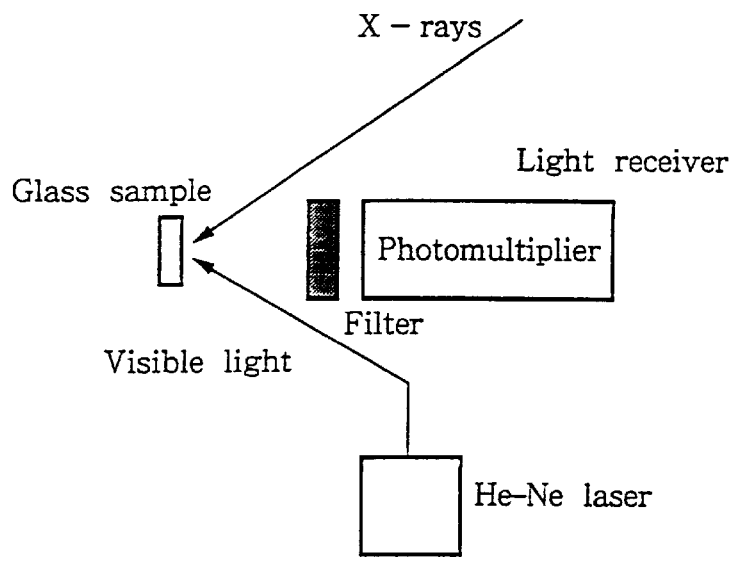
FIG. 1 shows a system for measuring photostimulated luminescence spectra.

The photostimulable phosphor of the invention shall now be described in more detail with reference to preferred embodiments thereof.

The photostimulable phosphor of the present invention which is a glass includes active cations such as $Ce^{3+}$, $Eu^{2+}$ etc. as cations essential for the trapping of the positive holes generated by excitation with radiation such as X-rays, γ-rays, α-rays, β-rays, electron beams, neutron beams, ion beams and ultraviolet rays having an energy equal to or greater than the band gap of the glass. It is preferred that the concentration of the active cations is set to be 10 mole % or less of all the cations which comprise the glass, and further preferred that it is set to be in the range of 0.001 to 2 mole %. If the concentration of active cations is too low, then it becomes impossible to trap almost any of the positive holes generated by the excitation with radiation. Conversely, if the concentration is too high, then clusters such as $Ce^{3+}$—O—$Ce^{3+}$ are formed, whereby concentration quenching due to energy transfer etc. tends to occur, with the result that the strength of the fluorescence is decreased.

Silicate glass, borate glass, phosphate glass, a mixed oxide glass consisting of at least two of a silicate, a borate and a phosphate, a halide glass or a halogen phosphate glass may be used as the glass. In the case that the photostimulable luminescence glass composition is an oxide glass, it is preferable that the glass includes 30 to 99 mole % of at least one of $Si^{4+}$, $B^{3+}$ and $p^{5+}$ as cations which form the glass network. If the total amount of $Si^{4+}$, $B^{3+}$ and $p^{5+}$ is less than 30 mole %, the formability of the glass is poor, and it tends to crystallize. On the other hand, if the total concentration of $Si^{4+}$, $B^{3+}$ and $p^{5+}$ exceeds 99 mole %, defects, which trap the electrons, are not easily formed in the glass. Furthermore, if the concentration of $Si^{4+}$ is greater than 99 mole %, it becomes difficult to prepare the glass using the conventional melting process. If the total concentration of $B^{3+}$ and $p^{5+}$ is greater than 99 mole %, the chemical durability of the glass is decreased. When taking into consideration both the stability with respect to crystallization and the melting property of the glass which is required for the shaping thereof, it is preferable that the total amount of $Si^{4+}$, $B^{3+}$ and p5+ is in a range of 45 to 95 mole %.

0 to 70 mole % of at least one of $Li^+$, $Na^+$, $K^+$, $Rb^+$, $Cs^+$ and $Tl^+$ should be included as cations which modify the glass network. As the amount of $Li^+$, $Na^+$, $K^+$, $Rb^+$, $Cs^+$ and $Tl^+$ in the glass increases, the number of defects which can trap electrons increases,. with the result that F-centres etc. are more easily generated in the glass upon exposure thereof to radiation. However, if the total concentration of $Li^+$, $Na^+$, $K^+$, $Rb^+$, $Cs^+$ and $Tl^+$ exceeds 70 mole %, the formability of glass is poor. It is more preferable that the total concentration of $Li^+$, $Na^+$, $K^+$, $Rb^+$, $Cs^+$, $Tl^+$ is in a range of 5 to 60 mole %.

$Mg^{2+}$, $Ca^{2+}$, $Sr^{2+}$, $Ba^{2+}$, $Cd^{2+}$, $Pb^{2+}$, $Zn^{2+}$ are cations which act to modify the glass network. As the amount of $Mg^{2+}$, $Ca^{2+}$, $Sr^{2+}$, $Ba^{2+}$, $Cd^{2+}$, $Pb^{2+}$ or $Zn^{2+}$ in the glass increases, in particular as $Ba^{2+}$ with a large atomic weight increases, the glass efficiently absorbs radiation, and the energy thereof is trapped and held by defects. Also, when the energy of the radiation is released by excitation with visible or infra-red light, the photostimulated luminescence is detected with high sensitivity. However, if the total concentration of $Mg^{2+}$, $Ca^{2+}$, $Sr^{2+}$, $Ba^{2+}$, $Cd^{2+}$, $Pb^{2+}$, $Zn^{2+}$ exceeds 70 mole %, the glass-forming ability is deteriorated. It is particularly preferred that the total concentration of the $Mg^{2+}$, $Ca^{2+}$, $Sr^{2+}$, $Ba^{2+}$, $Cd^{2+}$, $Pb^{2+}$, $Zn^{2+}$ is in a range of 0 to 40 mole %.

$Al^{3+}$ is a cation which functions to form the glass network. As the amount of $Al^{3+}$ in the glass increases, the durability, mechanical strength of the glass are improved. However if the concentration of the $Al^{3+}$ exceeds 30 mole %, the proportion of $Al^{3+}$ existing in the glass as $AlO_4$ increases, and since $AlO_4$ traps positive holes, there is the fear that the fluorescence emitted by stimulation will be weakened. It is particularly preferable that the concentration of $Al^{3+}$ is in a range of 0 to 10 mole %.

$Y^{3+}$, $Sc^{3+}$, $Ga^{3+}$, $In^{3+}$, $Bi^{3+}$ and $Ln^{3+}$ (Ln is a rare earth element other than Ce) are also cations which act to modify the glass network. As the amount of $Y^{3+}$, $Sc^{3+}$, $Ga^{3+}$, $In^{3+}$, $Bi^{3+}$, $Ln^{3+}$ increases, X-rays are absorbed by the glass more efficiently, and the energy thereof is trapped and held by the defects. However, if the total concentration of $Y^{3+}$, $Sc^{3+}$, $Ga^{3+}$, $In^{3+}$, $Bi^{3+}$ and $Ln^{3+}$ exceeds 40 mole %, the glass-forming ability becomes poor. It is particularly preferred that the total concentration of $Y^{3+}$, $Sc^{3+}$, $Ga^{3+}$, $In^{3+}$, $Bi^{3+}$, $Ln^{3+}$ is in a range of 0 to 30 mole %.

In the case that the photostimulable phosphor is a halide glass, it is preferred that it contains 10 to 60 mole % of $Al^{3+}$ as cations which form the glass network. If the content of $Al^{3+}$ is less than 10 mole % or greater than 60 mole %, the glass tends to crystallize. It is particularly preferred that the content of $Al^{3+}$ is in a range of 20 to 40 mole %.

It is preferred that the glass contains 8 to 70 mole % of at least one of $Mg^{2+}$, $Ca^{2+}$, $Sr^{2+}$ and $Ba^{2+}$ as divalent modifying ions which have the action of complementing the network structure of the glass. If the content of the divalent modifying ions is less than 8 mole % or greater than 70 mole %, the glass tends to crystallize. It is particularly preferred that the content of divalent modifying ions is in a range of 8 to 60 mole %.

It is preferred that the glass contains 0 to 30 mole % of at least one of $Y^{3+}$ and $Ln^{3+}$ (wherein Ln is a rare earth element other than Ce) as trivalent modifying ions which have the action of complementing the network structure of the glass. If the content of the trivalent modifying ions is greater than 30 mole %, the glass tends to crystallize. It is particularly preferred that the content of trivalent modifying ions is in a range of 0 to 25 mole %.

Furthermore, it is preferred that the glass contains 0 to 20 mole % of $Hf^{4+}$ as cations which form the network of the glass. If the content of $Hf^{4+}$ is greater than 20 mole %, the glass tends to crystallize. It is particularly preferred that the content of $Hf^{4+}$ is in a range of 0 to 15 mole %.

It is preferred that the glass contains 0 to 20 mole % of at least one of $Li^+$, $Na^+$ and $K^+$ as monovalent modifying ions which have the action of complementing the network structure of the glass. If the content of the monovalent modifying ions is greater than 20 mole %, then the glass tends to crystallize. It is particularly preferred that the content of monovalent modifying ions is in a range of 0 to 10 mole %.

Furthermore, it is preferred that the anions contained in the glass consist of 0 to 20 mole % of $Cl^-$ and 80 to 100 mole % of $F^-$. It is possible to improve the stability of the glass against crystallization by the addition of small amounts of $Cl^-$. However, if the content of $Cl^-$ exceeds 20 mole %, the chemical durability of the glass becomes poor, and the glass tends to crystallize. It is particularly preferred that the anions of the glass consist of 0 to 10 mole % of $Cl^-$ and 90 to 100 mole % of $F^-$.

On the other hand, in the case that the photostimulable phosphor is a halogen phosphate glass, the formability characteristic of the glass is further improved by the existence of 0.1 to 80 mole % of $p^{5+}$ in the glass in addition to the amounts of each kind of cation of the halide glass described above. If the content of $p^{5+}$ is less than 0.1 mole %, the effect of improving the formability of the glass is small, and if it exceeds 80 mole %, the chemical durability of the glass becomes poor. It is particularly preferred that the content of $p^{5+}$ is in a range of 5 to 60 mole %.

In this case, it is preferred that the anions consist of 1 to 95 mole % of $O^{2-}$, 0 to 20 mole % of $Cl^-$ and 5 to 99 mole % of $F^-$. If the content of $O^{2-}$ is less than 1 mole %, then the stability of the glass against crystallization is relatively poor. Conversely, if the content of $O^{2-}$ exceeds 95 mole %, the emission efficiency is decreased. Furthermore, if the content of $Cl^-$ exceeds 20 mole %, the glass tends to crystallize. It is particularly preferred that the anions in the glass consist of 1 to 50 mole % of $O^{2-}$, 0 to 10 mole % of $Cl^-$ and 40 to 99 mole % of $F^-$.

In the case that the photostimulable phosphor consisting of a glass is produced from raw materials including $Ce^{4+}$ and/or $Eu^{3+}$, the glass is melted and shaped in a reducing atmosphere or after addition of a reducing agent such as carbon to the batch. Even in the case that it is produced from raw materials including $Ce^{3+}$ and/or $Eu^{2+}$, it is preferred that the glass is melted and shaped in an inert or reducing atmosphere in order to prevent oxidation by oxidants remaining in the raw materials. If the glass is melted and shaped in air or in an oxidizing atmosphere, part of the Ce and Eu remain in the glass as $Ce^{4+}$ and $Eu^{3+}$ with a resulting decrease in the concentration of $Ce^{3+}$ and $Eu^{2+}$ which trap positive holes, together with a resulting decrease in the concentration of F-centres etc., which are capable of releasing electrons upon excitation with visible or infra-red light, due to $Ce^{4+}$ which is capable of trapping electrons, whereby the occurrence of photostimulated luminescence is reduced.

A photostimulable phosphor prepared in this way displays excellent glass formability, does not tend to crystallize, and can be easily formed into sheets, rods, or fibers etc. For example, it can be formed into flat sheet glass having dimensions of 400 mm×400 mm for use in X-ray photography, wherein complicated process steps can be omitted compared to the preparation of standard polycrystal photostimulable luminescence fluorescence sheets. Furthermore, a clear image is formed by scanning those parts which have been exposed to radiation with a fine laser beam of visible or infra-red light, detecting the intensity of the fluorescence generated from each of the exposed parts, and carrying out computer image processing.

Furthermore, a microchannel plate may be constructed by bundling together glass fibers having, for example, an 8 $\mu$m diameter core comprised of a glass including $Ce^{3+}$ and/or $Eu^{2+}$ and having a large refractive index, and a 10 $\mu$m diameter cladding not including any $Ce^{3+}$ and $Eu^{2+}$ and having a small refractive index. When such a microchannel plate is used, then the fluorescence generated upon exposure to the laser beam is capable of high resolution since there is no leakage to the outside of the fiber and no scattering of light. Furthermore, defects are generated along the whole length of the fiber upon exposure to radiation such as X-rays etc. When the core of the fiber is exposed to visible or infra-red light in this state, electrons trapped by defects in the core are released and combine with positive holes, the energy thereof excites the $Ce^{3+}$ or $Eu^{2+}$, and light is generated along the whole core. As a result, the light is detected with high sensitivity.

The present invention will now be described in more detail with reference to the following examples. The scope of the present invention shall not be limited to these examples.

EXAMPLE 1

High purity raw materials, $CeO_2$, $SiO_2$, $Na_2CO_3$, $Sm_2O_3$ were weighed out in proportions required to give a silicate glass having a composition whose cations are made up of 0.9 mole % of $Ce^{3+}$, 72.6 mole % of $Si^{4+}$, 25.6 mole % of $Na^+$ and 0.9 mole % of $Sm^{3+}$, mixed together and melted in a platinum crucible at 1450° C. for 30 minutes, and then subjected to cast forming to obtain a glass. This glass was then placed in a glassy carbon crucible, and subjected to reduction treatment for one hour by heating to 1450° C. in an atmosphere of $N_2$ containing 5 vol. % $H_2$. The melt was then quenched to near room temperature.

The glass thus produced was then cut and polished, after which its photostimulated luminescence spectrum, photostimulated luminescence excitation spectrum and afterglow characteristic were measured. The measuring system shown in FIG. 1 was used to measure the photostimulated luminescence spectrum. In this measuring system, the glass sample is exposed to X-rays from a tungsten target at 40 kV and 30 mA for 600 seconds, followed by exposure to excitation light from a 170 $\mu$W He—Ne laser (630 nm). The fluorescent light generated upon exposure to the He—Ne laser is measured after passing it through a B-410 band pass filter. Blue-colour (about 410 nm) photostimulated luminescence was observed.

Figure 2:
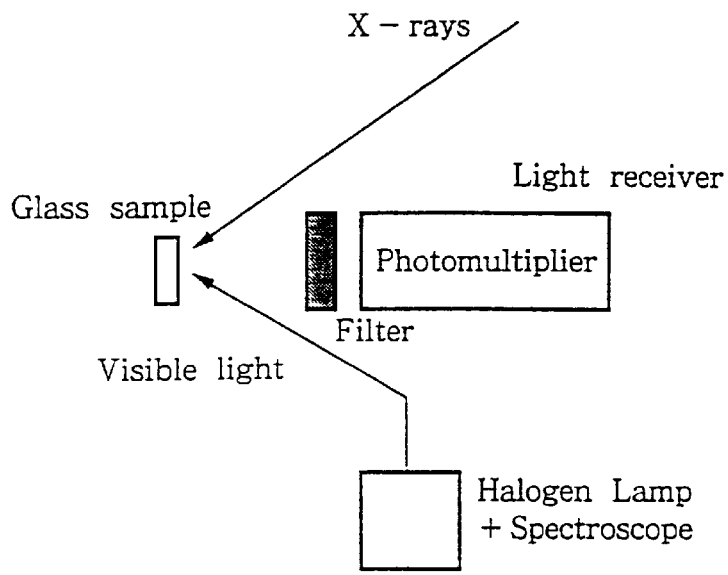
FIG. 2 shows a system for measuring photostimulated luminescence excitation spectra.
Figure 3:
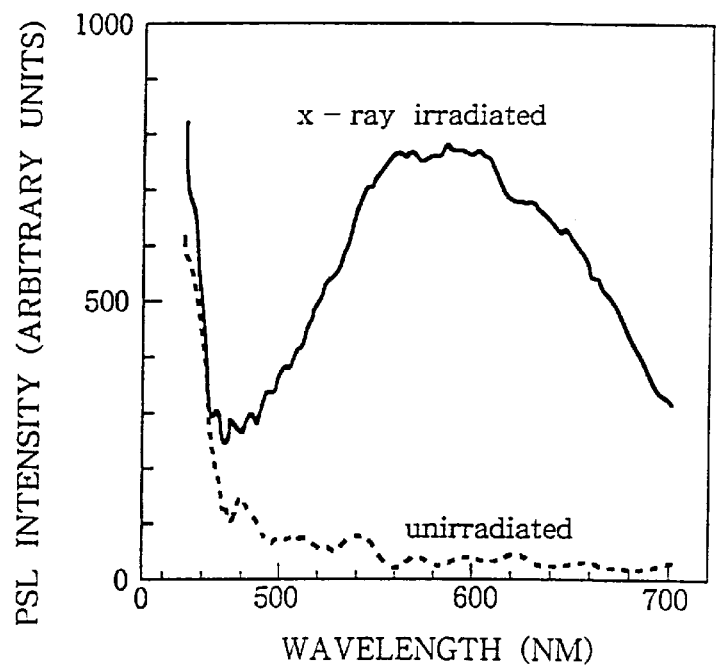
FIG. 3 shows the photostimulated luminescence excitation spectra of Example 1.

The measuring system shown in FIG. 2 was used to measure the photostimulated luminescence excitation spectrum. In this measuring system, the glass sample was exposed for 1800 seconds to X-rays from a W-target at 40 kV and 30 mA, and the emission at 410 nm was monitored. Light from a halogen lamp (100W) was passed through a spectroscope, and the excitation spectra of the secondary excitation emission was measured. A B-410 band pass filter and interference filter were used on the light-receiving side. As shown in FIG. 3, the detected photostimulated luminescence excitation spectra had a peak at about 600 nm, closely matching the He—Ne laser (633 nm). The short wavelength light in FIG. 3 was leaked light.

Figure 4:
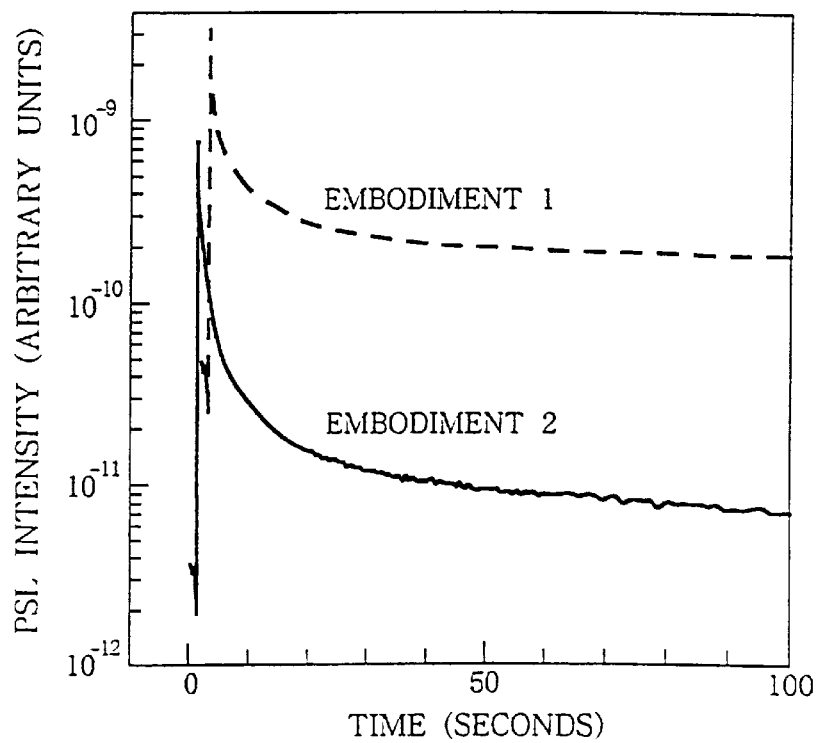
FIG. 4 shows the delay curves of Examples 1 and 2.

As can be seen from FIG. 4 which shows the delay curve, it was observed that the emission after exposure to the He—Ne laser dropped off extremely sharply, and was completely quenched within a period of ten seconds. In FIG. 4, the time-axis for Example 1 is slightly shifted to avoid overlap with the data of Example 2.

EXAMPLE 2

High purity raw materials, $CeO_2$, $B_2O_3$ and $Na_2CO_3$ were weighed out in proportions required to give a borate glass having a composition whose cations are made up of 0.5 mole % of $Ce^{3+}$, 74.6 mole % of $B^{3+}$ and 24.9 mole % of $Na^+$, mixed together, and melted in a platinum crucible at a temperature 1100° C. for 30 minutes to obtain a glass. This glass was then placed in a carbon crucible, and subjected to reduction treatment for one hour at 1100° C. in an atmosphere of $N_2$ containing 5 vol. % $H_2$. The melt was then quenched to near room temperature.

The glass thus produced was then cut and polished, after which its photostimulated luminescence spectrum and afterglow characteristic were measured in the same way as Example 1. The emitted fluorescent light was measured after passing it through a U-360 band pass filter. Photostimulated luminescence in the ultra-violet region at about 360 nm was observed. As shown in FIG. 4, the delay curve showed an extremely sharp drop-off.

EXAMPLE 3

High purity raw materials $CeO_2$, $SiO_2$, $Cs_0CO_3$ were weighed out in proportions required to give a silicate glass having a composition whose cations are made up of 0.15 mole % of $Ce^{3+}$, 53.76 mole % of $Si^{4+}$ and 46.09 mole % of $Cs^+$, mixed together and melted in a platinum crucible at 1500° C. for 30 minutes, to obtain a glass. This glass was then crushed and placed in a platinum crucible, and then this platinum crucible was placed in an alumina crucible packed with carbon powder. A lid was placed on the alumina crucible, and reduction treatment was carried out for 1 hour at 1550° C. in an electric oven heated by a Si-Mo heater. The melt was then quenched to near room temperature to obtain a glass.

The glass thus produced was then cut and polished, after which its photostimulated luminescence spectrum and afterglow characteristic were measured in the same way as Example 1. Blue-colour photostimulated luminescence at about 410 nm was observed. The delay curve also displayed an extremely sharp drop off.

EXAMPLE 4

High purity raw materials, $CeO_2$, $B_2O_3$, $Li_2CO_3$, $BaCO_3$ and $Al_2O_3$ were weighed out in proportions required to give a borate glass having a composition whose cations are made up of 0.05 mole % of $Ce^{3+}$, 76.49 mole % of $B^{3+}$, 20.40 mole % of $Li^+$, 2.04 mole % of $Ba^{2+}$ and 1.02 mole % of $Al^{3+}$, mixed together and melted in a platinum crucible at 1150° C. for 30 minutes, to obtain a glass. This glass was then crushed, placed in a glassy carbon crucible, and subjected to reduction treatment for one hour at 1550° C. in an atmosphere of $N_2$ consist containing 5 vol. % $H_2$. The melt was then quenched to near room temperature.

The glass thus produced was then cut and polished, after which its photostimulated luminescence spectrum was measured in the same way as Example 2. Photostimulated luminescence in the ultra-violet region at about 360 nm was observed.

EXAMPLE 5

High purity raw materials, $CeO_2$, $SiO_2$, $Rb_2CO_3$, $MgCO_3$ and $La_2O_3$ were weighed out in proportions required to give a silicate glass having a composition whose cations are made up of 1.53 mole % of $Ce^{3+}$, 58.44 mole % of $Si^{4+}$, 38.17 mole % of $Rb^+$, 0.76 mole % of $Mg^{2+}$ and 1.10 mole % of $La^{3+}$, mixed together and melted in a platinum crucible at 1550° C. for 30 minutes, to obtain a glass. This glass was then crushed, placed in a carbon crucible, and subjected to reduction treatment for one hour at 1550° C. in an atmosphere of $N_2$ containing 5 vol. % $H_2$. The melt was then quenched to near room temperature.

The glass thus produced was then cut and polished, after which its photostimulated luminescence spectrum was measured in the same way as Example 1. Blue-colour photostimulated luminescence at about 410 nm was observed.

EXAMPLE 6

High purity raw materials $CeO_2$, $SiO_2$, $Na_2CO_3$ and $Y_2O_3$ were weighed out in proportions required to give a silicate glass having a composition whose cations are made up of 0.5 moles % of $Ce^{3+}$, 80.36 mole % of $Si^{4+}$, 17.86 mole % of $Na^+$ and 1.28 mole % of $Y^{3+}$, mixed together and melted in a platinum crucible at 1500° C. for 30 minutes, to obtain a glass. This glass was then crushed, placed in a carbon crucible, and subjected to reduction treatment for one hour at 1500° C. in an atmosphere of $N_2$ containing 5 vol. % $H_2$. The melt was then quenched to near room temperature.

The glass thus produced was then cut and polished, after which its photostimulated luminescence spectrum was measured in the same way as Example 1. Blue-colour photostimulated luminescence at about 410 nm was observed.

EXAMPLE 7

High purity raw materials $EU_2O_3$, $B_2CO_3$, $Rb_2CO_3$ and $Sm_2O_3$ were weighed out in proportions required to give a borate glass having a composition whose cations are made up of 0.5 mole % of $Eu^{2+}$, 89.1 mole % of $B^{3+}$, 9.9 mole % of $Rb^+$ and 0.5 mole % of $Sm^{3+}$, mixed together and melted in a platinum crucible at 1100° C. for 30 minutes, to obtain a glass. This glass was then crushed, placed in a glassy carbon crucible, and subjected to reduction treatment for one hour at 1100° C. in an atmosphere of $N_2$ containing 5 vol. % $H_2$. The melt was then quenched to near room temperature.

The glass thus produced was then cut and polished, and it was confirmed by standard fluorescence that Eu and Sm were present in the glass in the form of $Eu^{2+}$ and $Sm^{3+}$ respectively. The photostimulated luminescence spectrum was measured in the same way as Example 1. Blue-colour photostimulated luminescence at about 410 nm was observed.

EXAMPLE 8

High purity raw materials, $Eu_2O_3$, $CeO_2$, $B_2O_3$, $SiO_2$ and $K_2CO_3$ were weighed out in proportions required to give a borosilicate glass having a composition whose cations are made up of 0.5 mole % of $Eu^{2+}$, 0.5 mole % of $Ce^{3+}$, 71.1 mole % of $B^{3+}$, 2.5 mole % of $Si^{4+}$ and 25.4 mole % of $K^+$, mixed together and melted in a platinum crucible at 1100° C. for 1 hour, to obtain a glass. This glass was then crushed, placed in a glassy carbon crucible, and subjected to reduction treatment for one hour at 1100° C. in an atmosphere of $N_2$ containing 5 vol. % $H_2$. The melt was then quenched to near room temperature.

The glass thus produced was then cut and polished, after which its photostimulated luminescence spectrum was measured in the same way as Example 1. Blue-colour photostimulated luminescence at about 410 nm was observed.

EXAMPLE 9

High purity raw materials $CeO_2$, $P_2O_5$, $Al_2O_3$ and $Na_2CO_3$ were weighed out in proportions required to give a phosphate glass having a composition whose cations are made up of 0.05 mole % of $Ce^{3+}$, 39.98 mole % of $p^{5+}$, 49.98 mole % of $Na^+$ and 9.99 mole % of $Al^{3+}$, mixed together and melted in a platinum crucible at 1250° C. for 1 hour, to obtain a glass. This glass was then crushed, placed in a glassy carbon crucible, and subjected to reduction treatment for one hour at 1250° C. in an atmosphere of $N_2$ containing 5 vol. % $H_2$. The melt was then quenched to near room temperature.

The glass thus produced was then cut and polished, after which its photostimulated luminescence spectrum was measured in the same way as Example 2. Photostimulated luminescence in the ultra-violet region at about 350 nm was observed.

EXAMPLE 10

High purity raw materials $CeO_2$, $P_2O_5$, $Al_2O_3$, $Bi_2O_3$ and $Na_2CO_3$ were weighed out in proportions required to give a phosphate glass having a composition whose cations are made up of 0.05 mole % of $Ce^{3+}$, 59.97 mole % of $p^{5+}$, 29.98 mole % of $Na^+$, 1.00 mole % of $Bi^{3+}$ and 9.00 mole % of $Al^{3+}$, mixed together and melted in a platinum crucible at 1250° C. for 1 hour, to obtain a glass. This glass was then crushed, placed in a glassy carbon crucible, and subjected to reduction treatment for one hour at 1250° C. in an atmosphere of $N_2$ containing 5 vol. % $H_2$. The melt was then quenched to near room temperature.

The glass thus produced was then cut and polished, after which its photostimulated luminescence spectrum was measured in the same way as Example 2. Photostimulated luminescence in the ultra-violet region at about 340 nm was observed.

EXAMPLE 11

High purity raw materials $CeO_2$, $P_2O_5$, $Al_2O_3$, $Ga_2O_3$, ZnO and $Na_2CO_3$ were weighed out in proportions required to give a phosphate glass having a composition whose cations are made up of 0.05 mole % of $Ce^{3+}$, 5.26 mole % of $Zn^{2+}$, 52.60 mole % of $p^{5+}$, 31.57 mole % of $Na^+$, 5.26 mole % of $Ga^{3+}$ and 5.26 mole % of $Al^{3+}$, mixed together and melted in a platinum crucible at 1250° C. for 1 hour, to obtain a glass. This glass was then crushed, placed in a glassy carbon crucible, and subjected to reduction treatment for one hour at 1250° C. in an atmosphere of $N_2$ containing 5 vol. % $H_2$. The melt was then quenched to near room temperature.

The glass thus produced was then cut and polished, after which its photostimulated luminescence spectrum was measured in the same way as Example 2. Photostimulated luminescence in the ultra-violet region at about 340 nm was observed.

EXAMPLE 12

High purity raw materials $EuF_2$, $MgF_2$, $AlF_3$, $CaF_2$, $SrF_2$, $BaF_2$ and $YF_3$ were weighed out in proportions required to give a glass having a composition whose cations are made up of 0.1 mole % of $Eu^{2+}$, 35 mole % of $Al^{3+}$, 10 mole % of $Mg^{2+}$, 20 mole % of $Ca^{2+}$, 10 mole % of $Sr^{2+}$, 10 mole % of $Ba^{2+}$ and 14.9 mole % of $Y^{3+}$, and whose anions are made up of 100 mole % of $F^-$, mixed together, and placed in a glassy carbon crucible; all the above was done in a glove box filled with $N_2$. The mixture was then melted in a nitrogen atmosphere at 1000° C. for 1 hour, and then the melt was then cooled to near the glass transition temperature $T_g$.

The glass thus produced was then cut and polished, after which its photostimulated luminescence spectrum was measured in the same way as Example 1. Blue-colour photostimulated luminescence at about 400 nm was observed.

EXAMPLE 13

High purity raw materials $EuF_2$, $MgF_2$, $AlF_3$, $CaF_2$, $SrF_2$, $BaF_2$, $BaCl_2$ and $YF_3$ were weighed out in proportions required to give a glass having a composition whose cations are made up of 1 mole % of $Eu^{2+}$, 35 mole % of $Al^{3+}$, 10 mole % of $Mg^{2+}$, 20 mole % of $Ca^{2+}$, 10 mole % of $Sr^{2+}$, 10 mole % of $Ba^{2+}$ and 14 mole % of $Y^{3+}$, and whose anions are made up of 4.1 mole % of $Cl^-$ and 95.9 mole % of $F^-$, mixed together, and placed in a glassy carbon crucible; all the above was done in a glove box filled with $N_2$. The mixture was then melted in a nitrogen atmosphere at 1000° C. for 1 hour, after which the melt was then cooled to near the glass transition temperature $T_g$.

The glass thus produced was then cut and polished, after which its photostimulated luminescence spectrum was measured in the same way as Example 1. Blue-colour photostimulated luminescence at about 410 nm was observed.

EXAMPLE 14

High purity raw materials $EuF_2$, $MgF_2$, $AlF_3$, $CaF_2$, $SrF_2$, $BaF_2$ and $Al(PO)_3$ were weighed out in proportions required to give a glass having a composition whose cations are made up of 0.8 mole % of $Eu^{2+}$, 18.8 mole % of $Al^{3+}$, 7.7 mole % of $Mg^{2+}$, 19.3 mole % of $Ca^{2+}$, 17.8 mole % of $Sr^{2+}$, 7.7 mole % of $Ba^{2+}$, and 27.9 mole % of $p^{5+}$, and whose anions are made up of 36 mole % of O2- and 64 mole % of $F^-$, mixed together, and placed in a glassy carbon crucible; all the above was done in a glove box filled with $N_2$. The mixture was then melted in an atmosphere of $N_2$ containing 5vol % $H_2$ at 1000° C. for 1 hour, and then the melt was then cooled to near the glass transition temperature $T_g$.

The glass thus produced was then cut and polished, after which its photostimulated luminescence spectrum was measured in the same way as Example 1. Blue-colour photostimulated luminescence at about 440 nm was observed.

We claim:

1. A radiation imaging device comprising:
    a photostimulable phosphor which emits fluorescence in an ultraviolet or blue colour wavelength region when those parts which have been exposed to radiation are excited by visible or infra-red light, and which is a glass containing at least one of $Ce^{3+}$ and $Eu^{2+}$ as an active cation; and
    a radiation source adapted to irradiate said photostimulable phosphor whereby when said irradiated photostimulable phosphor is excited with visible or infra-red light, said irradiated photostimulable phosphor emits fluorescence in an ultraviolet or blue colour wavelength region.

2. The device as claimed in claim 1, wherein the total amount of at least one of $Ce^{3+}$ and $Eu^{2+}$ is at most 10 mole % on the basis of all cations.

3. The device as claimed in claim 1, wherein said glass is a silicate glass, a borate glass, a phosphate glass or a mixed oxide glass consisting of at least two of a silicate, a borate and a phosphate.

4. The device as claimed in claim 1, wherein the glass includes halide ions as one of anions.

5. The device as claimed in claim 1, wherein said glass is in the form of a flat sheet, a curved sheet, a rod, a fiber or a microchannel plate having a flat structure.

6. The device as claimed in claim 1, wherein said glass is formed as a microchannel plate constructed by bundling together glass fibers, wherein each said glass fiber comprises a core glass including at least one of $Ce^{3+}$ or $Eu^{2+}$ and having a large refractive index and a cladding glass including neither $Ce^{3+}$ nor $Eu^{2+}$ and having a small refractive index.

7. A radiation imaging device comprising:
    a photostimulable phosphor which emits fluorescence in an ultraviolet or blue colour wavelength region when those parts which have been exposed to radiation are excited by visible or infra-red light, and which is an oxide glass containing at most 10 mole % of at least one of $Ce^{3+}$ and $Eu^{2+}$, and as cations 30–99 mole % of at least one of $Si^{4+}$, $B^{3+}$ and $P^{5+}$, 0–70 mole % of at least one of $Li^+$, $Na^+$, $K^+$, $Rb^+$, $Cs^+$ and $Tl^+$, 0–70 mole % of at least one of $Mg^{2+}$, $Ca^{2+}$, $Sr^{2+}$, $Ba^{2+}$, $Cd^{2+}$, $Pb^{2+}$ and $Zn^{2+}$, 0–30 mole % of $Al^{3+}$, and 0–40 mole % of at least one of $Y^{3+}$, $Sc^{3+}$, $Ga^{3+}$, $In^{3+}$, $Bi^{3+}$ and $Ln^{3+}$ (wherein Ln is a rare earth element other than Ce), wherein the percentages are based on the total of all cations; and
    a radiation source adapted to irradiate said photostimulable phosphor whereby when said irradiated photostimulable phosphor is excited with visible or infra-red light, said irradiated photostimulable phosphor emits fluorescence in an ultraviolet or blue colour wavelength region.

8. The device as claimed in claim 7, which is an oxide glass containing at most 10 mole % of at least one of $Ce^{3+}$ and $Eu^{2+}$, and includes as cations 45–95 mole % of at least one of $Si^{4+}$, $B^{3+}$ and $P^{5+}$, 5–60 mole % of at least one of $Li^+$, $Na^+$, $K^+$, $Rb^+$, $Cs^+$ and $Tl^+$, 0–40 mole % of at least one of $Mg^{2+}$, $Ca^{2+}$, $Sr^{2+}$, $Ba^{2+}$, $Cd^{2+}$, $Pb^{2+}$ and $Zn^{2+}$, 0–10 mole % of $Al^{3+}$, and 0–30 mole % of at least one of $Y^{3+}$, $Sc^{3+}$, $Ga^{3+}$, $In^{3+}$, $Bi^{3+}$ and $Ln^{3+}$ (wherein Ln is a rare earth element other than Ce), wherein the percentages are based on the total of all cations.

9. The device as claimed in claim 7, wherein said glass is in the form of a flat sheet, a curved sheet, a rod, a fiber or a microchannel plate having a flat structure.

10. The device as claimed in claim 7, wherein said glass is formed as a microchannel plate constructed by bundling together glass fibers, wherein each said glass fiber comprises a core glass including at least one of $Ce^{3+}$ or $Eu^{2+}$ and having a large refractive index and a cladding glass including neither $Ce^{2+}$ nor $Eu^{2+}$ and having a small refractive index.

11. A radiation imaging device comprising:
a photostimulable phosphor which emits fluorescence in an ultraviolet or blue colour wavelength region when those parts which have been exposed to radiation are excited by visible or infrared light, and which is a halide glass containing at most 10 mole % of at least one of $Ce^{3+}$ and $Eu^{2+}$, and as cations, 10–60 mole % of $Al^{3+}$, 8–70 mole % of at least one of $Mg^{2+}$, $Ca^{2+}$, $Sr^{2+}$ and $Ba^{2+}$, 0–30 mole % of at least one of $Y^{3+}$ and $Ln^{3+}$ (wherein Ln is a rare earth element other than Ce), 0–20 mole % of $Hf^{4+}$, and 0–20 mole % of at least one of $Li^+$, $Na^+$ and $K^+$, wherein the percentages are based on the total of all cations, and as anions 0–20 mole % of $Cl^-$ and 80–100 mole % of $F^-$, wherein the percentages are based on the total of all anions; and
a radiation source adapted to irradiate said photostimulable phosphor whereby when said irradiated photostimulable phosphor is excited with visible or infra-red light, said irradiated photostimulable phosphor emits fluorescence in an ultraviolet or blue colour wavelength region.

12. The device as claimed in claim 11, which is a halide glass containing at most 10 mole % of at least one of $Ce^{3+}$ and $Eu^{2+}$, and includes as cations 20–40 mole % of $Al^{3+}$, 8–60 mole % of at least one of $Mg^{2+}$, $Ca^{2+}$, $Sr^{2+}$ and $Ba^{2+}$, 0–25 mole % of at least one of $Y^{3+}$ and $Ln^{3+}$ (wherein Ln is a rare earth element other than Ce), 0–15 mole % of $Hf^{4+}$, and 0–10 mole % of at least one of $Li^+$, $Na^+$ and $K^+$, wherein the percentages are based on the total of all cations, and as anions 0–10 mole % of $Cl^-$ and 90–100 mole % of $F^-$, wherein the percentages are based on the total of all anions.

13. The device as claimed in claim 11, wherein said glass is in the form of a flat sheet, a curved sheet, a rod, a fiber or a microchannel plate having a flat structure.

14. The device as claimed in claim 11, wherein said glass is formed as a microchannel plate constructed by bundling together glass fibers, wherein each said glass fiber comprises a core glass including at least one of $Ce^{3+}$ or $Eu^{2+}$ and having a large refractive index and a cladding glass including neither $Ce^{3+}$ nor $Eu^{2+}$ and having a small refractive index.

15. A radiation imaging device comprising:
a photostimulable phosphor which emits fluorescence in an ultraviolet or blue colour wavelength region when those parts which have been exposed to radiation are excited by visible or infra-red light, and which is a halogen phosphate glass containing at most 10 mole % of at least one of $Ce^{3+}$ and $Eu^{2+}$, and as cations 10–60 mole % of $Al^{3+}$, 0.1–80 mole % of $P^{5+}$, 8–70 mole % of at least one of $Mg^{2+}$, $Ca^{2+}$, $Sr^{2+}$ and $Ba^{2+}$, 0–30 mole % of at least one of $Y^{3+}$ and $Ln^{3+}$ (wherein Ln is a rare earth element other than Ce), 0–20 mole % of $Hf^{4+}$, and 0–20 mole % of at least one of $Li^+$, $Na^+$ and $K^+$, wherein the percentages are based on the total of all cations, and as anions 1–95 mole % of $O^{2-}$, 0–20 mole % of $Cl^-$ and 5–99 mole % of $F^-$, wherein the percentages are based on the total of all anions; and
a radiation source adapted to irradiate said photostimulable phosphor whereby when said irradiated photostimulable phosphor is excited with visible or infra-red light, said irradiated photostimulable phosphor emits fluorescence in an ultraviolet or blue colour wavelength region.

16. The device as claimed in claim 9, which is a halogen phosphate glass containing at most 10 mole % of at least one of $Ce^{3+}$ and $Eu^{2+}$, and includes as cations 20–40 mole % of $Al^{3+}$, 5–60 mole % of $P^{5+}$, 8–60 mole % of at least one of $Mg^{2+}$, $Ca^{2+}$, $Sr^{2+}$ and $Ba^{2+}$, 0–25 mole % of at least one of $Y^{3+}$ and $Ln^{3+}$ (wherein Ln is a rare earth element other than Ce), 0–15 mole % of $Hf^{4+}$, and 0–10 mole % of at least one of $Li^+$, $Na^+$ and $K^+$, wherein the percentages are based on the total of all cations, and as anions 1–50 mole % of $O^{2-}$, 0–10 mole % of $Cl^-$ and 40–99 mole % of $F^-$, wherein the percentages are based on the total of all anions.

17. The device as claimed in claim 16, wherein said glass is in the form of a flat sheet, a curved sheet, a rod, a fiber or a microchannel plate having a flat structure.

18. The device as claimed in claim 16, wherein said glass is formed as a microchannel plate constructed by bundling together glass fibers, wherein each said glass fiber comprises a core glass including at least one of $Ce^{3+}$ or $Eu^{2+}$ and having a large refractive index and a cladding glass including neither $Ce^{3+}$ nor $Eu^{2+}$ and having a small refractive index.

* * * * *

UNITED STATES PATENT AND TRADEMARK OFFICE
CERTIFICATE OF CORRECTION

PATENT NO. : 5,977,556
DATED : November 2, 1999
INVENTOR(S) : Jianorong Qiu et al.

It is certified that error appears in the above-identified patent and that said Letters Patent is hereby corrected as shown below:

Column 1 Line 13 "a glass composition used" should read --a glass used--.

Column 1, after Line 16 insert:
    --BACKGROUND OF THE INVENTION--.

Column 1 Lines 20-21 "user of a X-ray" should read --user of an X-ray--.

Column 3 Line 23 "p$^{5+}$" should read --P$^{5+}$--.

Column 3 Line 24 "Li$^+$, Na$^+$" should read --Li$^+$, Na$^+$--.

Column 3 Line 64 "to a photostimulable" should read --to give a photostimulable--.

Column 3 Line 65 after "composition" delete comma --,--.

Column 4 Line 46 "band gap" should read --bandgap--.

Column 5 Line 12 "band gap" should read --bandgap--.

Column 5 Line 28 "p$^{5+}$" should read --P$^{5+}$--.

Column 5 Line 29 "p$^{5+}$" should read --P$^{5+}$--.

Column 5 Line 32 "p$^{5+}$" should read --P$^{5+}$--.

Column 5 Line 36 "p$^{5+}$" should read --P$^{5+}$--.

UNITED STATES PATENT AND TRADEMARK OFFICE
CERTIFICATE OF CORRECTION

PATENT NO. : 5,977,556
DATED : November 2, 1999
INVENTOR(S) : Jianorong Qiu et al.

It is certified that error appears in the above-identified patent and that said Letters Patent is hereby corrected as shown below:

Column 5 Line 41 "$p^{5+}$" should read --$P^{5+}$--.

Column 5 Line 47 after "increases," delete period --.--.

Column 6 Line 67 "$p^{5+}$" should read --$P^{5+}$--.

Column 7 Line 2 "$p^{5+}$" should read --$P^{5+}$--.

Column 7 Line 6 "$p^{5+}$" should read --$P^{5+}$--.

Column 8 Line 38 "delay curve" should read --decay curve--.

Column 8 Line 62 "delay curve" should read --decay curve--.

Column 8 Line 66 "$Cs_0CO_3$" should read --$Cs_2CO_3$--.

Column 9 Line 16 "The delay curve" should read --The decay curve--.

Column 9 Line 29 delete "consist"

Column 9 Lines 58-59 "0.5 moles" should read --0.5 mole%--.

Column 10 Line 5 "EU" should read --Eu--.

Column 10 Line 5 "$B_2CO_3$" should read --$B_2O_3$--.

Column 10 Line 46 "$p^{5+}$" should read --$P^{5+}$--.

Column 10 Line 65 "$p^{5+}$" should read --$P^{5+}$--.

UNITED STATES PATENT AND TRADEMARK OFFICE
CERTIFICATE OF CORRECTION

PATENT NO. : 5,977,556
DATED : November 2, 1999
INVENTOR(S) : Jianorong Qiu et al.

It is certified that error appears in the above-identified patent and that said Letters Patent is hereby corrected as shown below:

Column 11 Line 18 "p$^{5+}$" should read --P$^{5+}$--.

Column 12 Line 7 "p$^{5+}$" should read --P$^{5+}$--.

Column 12 Line 8 "02-" should read --O$^{2-}$--.

Signed and Sealed this

Twenty-fifth Day of July, 2000

Attest:

Q. TODD DICKINSON

Attesting Officer     Director of Patents and Trademarks